United States Patent [19]
Atkins et al.

[11] Patent Number: 6,058,248
[45] Date of Patent: May 2, 2000

[54] COMPUTERIZED METHOD FOR IMPROVING DATA RESOLUTION

[75] Inventors: Brian Atkins, Mountain View, Calif.; Charles A Bouman; Jan P. Allebach, both of West Lafayette, Ind.; Jay S Gondek, St Camas, Wash.; Morgan T Schramm, Portland, Oreg.; Frank W. Sliz, Vancouver, Wash.

[73] Assignee: Hewlett-Packard Company, Palo Alto, Calif.

[21] Appl. No.: 09/318,201

[22] Filed: May 25, 1999

Related U.S. Application Data

[62] Division of application No. 08/837,619, Apr. 21, 1997.

[51] Int. Cl.[7] .................................................... G06F 15/00
[52] U.S. Cl. ............................................ 395/102; 382/299
[58] Field of Search ..................................... 395/102, 117, 395/109, 114, 108; 382/205, 299, 300, 260, 261, 262, 263, 264, 265, 293, 254, 298; 358/448, 447, 428, 525, 445, 458, 433

[56] References Cited

U.S. PATENT DOCUMENTS

| | | | |
|---|---|---|---|
| 5,270,728 | 12/1993 | Lund et al. | 395/108 |
| 5,270,836 | 12/1993 | Kang | 358/448 |
| 5,282,057 | 1/1994 | Mailloux et al. | 358/445 |
| 5,313,287 | 5/1994 | Barton | 358/458 |
| 5,377,018 | 12/1994 | Rafferty | 358/433 |
| 5,394,485 | 2/1995 | Lowe et al. | 382/254 |
| 5,446,804 | 8/1995 | Allebach et al. | 382/298 |
| 5,539,866 | 7/1996 | Banton et al. | 395/117 |
| 5,579,445 | 11/1996 | Loce et al. | 395/102 |
| 5,703,618 | 12/1997 | Eglit | 382/300 |
| 5,758,034 | 5/1998 | Loce et al. | 395/102 |

*Primary Examiner*—Dov Popvici

[57] ABSTRACT

A data resolution synthesis algorithm takes low resolution source input data (e.g., data degraded from compression or data acquired from low quality imaging devices) to synthesize high resolution output data. In an exemplary embodiment for color printing, the algorithm is performed by characterizing a multi-pixel area, or window, around a pixel that can benefit from resolution enhancement. To interpolate to a high resolution output a set of spatial filters is applied to the data area based on the window characterization. The output of the resolution synthesizer is a set of multiple pixels for each input pixel, representing the source input pixel in a higher resolution enhanced version. The filters are chosen from a stored data base (generic or specifically applicable data base for each type input device) created to fit input/output device requirements.

39 Claims, 12 Drawing Sheets

(1 of 12 Drawing Sheet(s) Filed in Color)

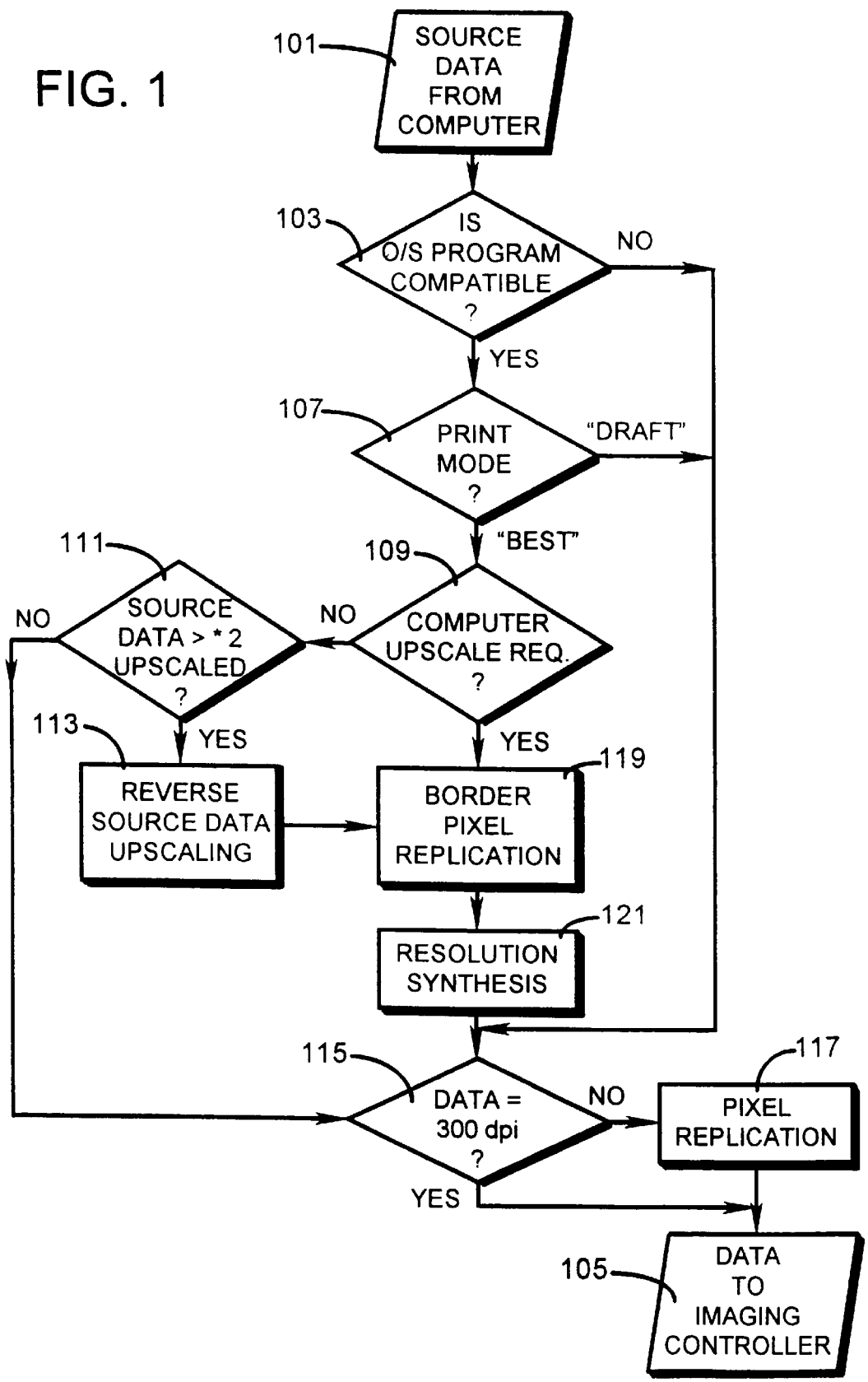

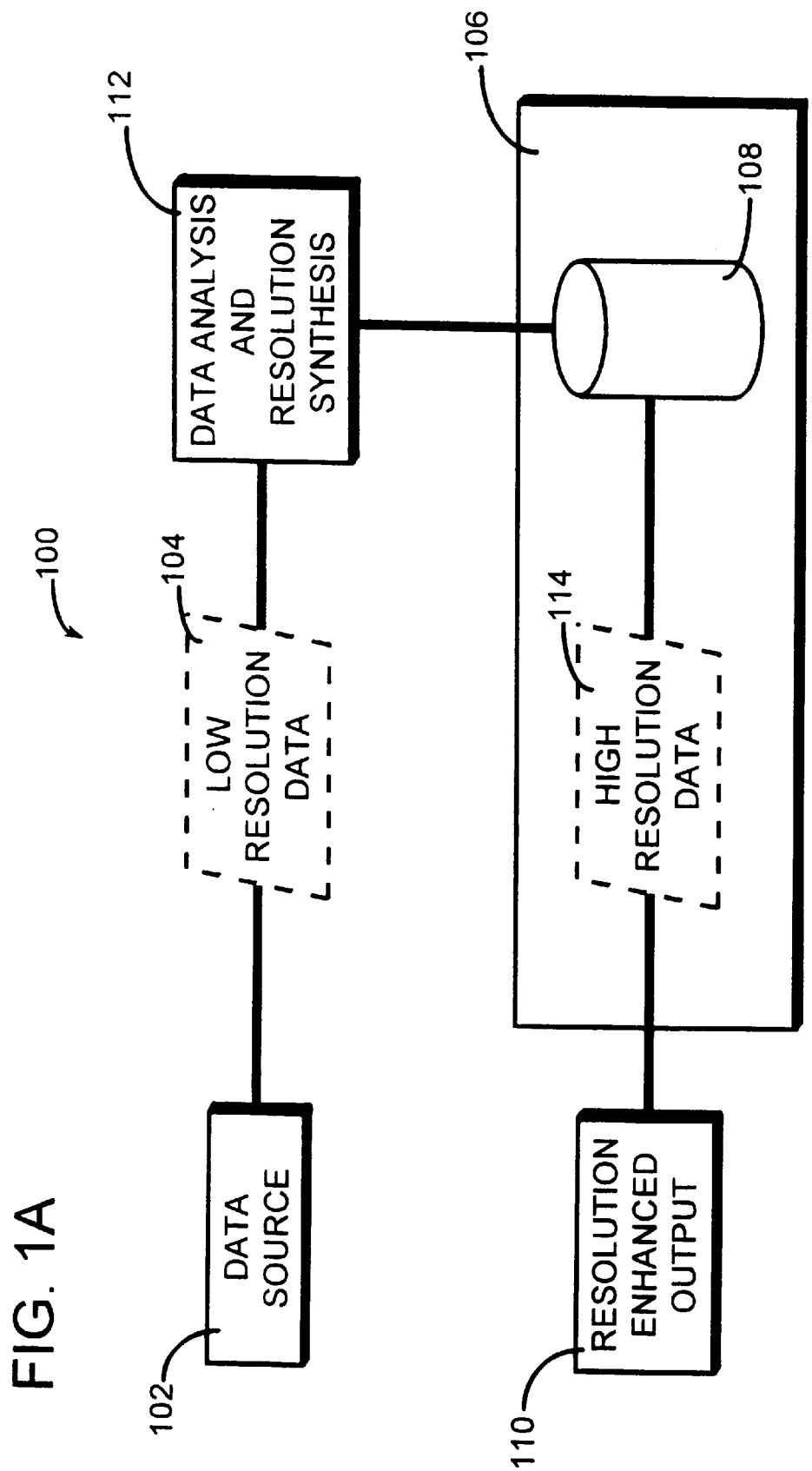

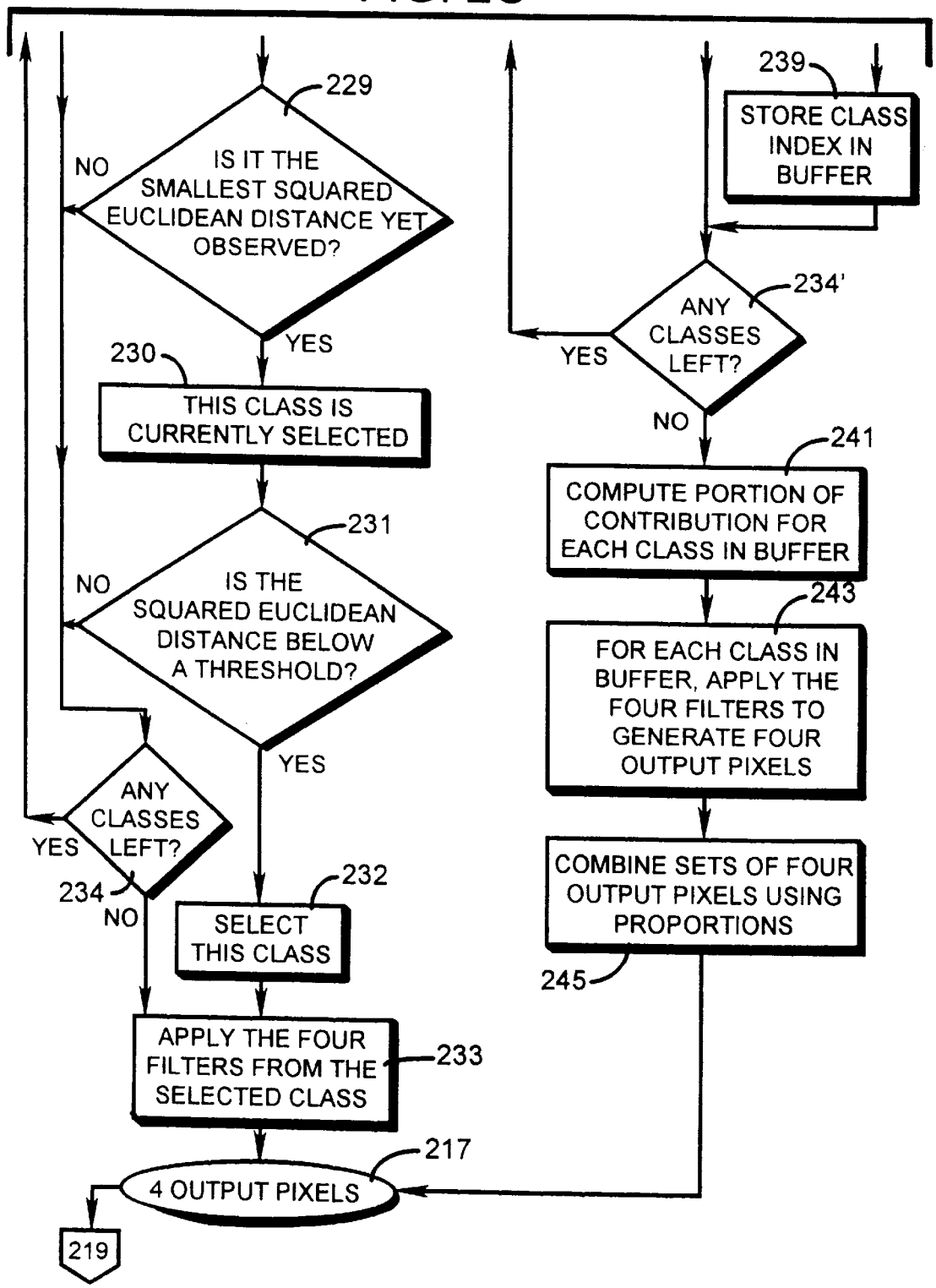

| Class # | Location Vector (Mean Vector) | 9 Point 3x3-1 Output Filters (one for each 2x2 output pixel) | |
|---|---|---|---|
| 0 | ▭▭▭▭▭▭ | Filter 0, Filter 1, Filter 2, Filter 3 | ⬚ F0 F1 / F2 F3  0 |
| 1 | ▭▭▭▭▭▭ | Filter 0, Filter 1, Filter 2, Filter 3 | |
| 2 | ▭▭▭▭▭▭ | Filter 0, Filter 1, Filter 2, Filter 3 | |
| 3 | ▭▭▭▭▭▭ | Filter 0, Filter 1, Filter 2, Filter 3 | |
| 4 | ▭▭▭▭▭▭ | Filter 0, Filter 1, Filter 2, Filter 3 | |
| 5 | ▭▭▭▭▭▭ | Filter 0, Filter 1, Filter 2, Filter 3 | |
| 6 | ▭▭▭▭▭▭ | Filter 0, Filter 1, Filter 2, Filter 3 | |
| 7 | ▭▭▭▭▭▭ | Filter 0, Filter 1, Filter 2, Filter 3 | |
| ⋮ | ⋮ | ⋮ | |
| 98 | ▭▭▭▭▭▭ | Filter 0, Filter 1, Filter 2, Filter 3 | |
| 99 | ▭▭▭▭▭▭ | Filter 0, Filter 1, Filter 2, Filter 3 | |
| 100 | ▭▭▭▭▭▭ | Filter 0, Filter 1, Filter 2, Filter 3 | F0 F1 / F2 F3  100 |

COMPUTERIZED METHOD FOR IMPROVING DATA RESOLUTION

CROSS REFERENCE TO RELATED APPLICATIONS

This is a divisional of copending application Ser. No. 08/837,619 filed on Apr. 21, 1997.

BACKGROUND OF THE INVENTION

1. Field of the Invention

The present invention relates generally to computer processes for interpolating input data which relates to data structures representing functional and structural aspects of physical objects or activities. More particularly, the present invention relates to computerized method for improving data resolution. A specific implementation of the present invention is described for a method for graphics image processing data analysis and resolution synthesis enhancements.

2. Description of Related Art

For many computer process applications, it is necessary to interpolate input data comprising source apparatus low resolution output data in order to achieve acceptable, usable, or improved results.

Representative data often presents a low resolution input data set that is a poor replication of the original source. The data presents something much less than a true-life rendering. Many types of source data can benefit by data resolution enhancement: computer image data, digital or analog video data, geographic data measured on a regular grid, vector field data, speech synthesis signals data, and the like..

As to more specific examples in the field of image processing - such as digital scanning, dot matrix printing, digital camera to video display conversion, WEBTV™ and other Internet provider data, JPEG computer image standards, CDROM, magnetic resonance imaging, interframe interpolation for analog video, and the like—the source of the imaging data often provides graphical image data (including bit mapped alphanumeric text images) which is of a relatively low resolution. The term "graphics" as used herein shall be understood to be generic for all forms of imaging. Therefore, output renderings made directly from the source data may be of a low quality.

Moreover, source images—such as JPEG photographs, Internet and WEBTV files—are often compressed using relatively high data loss compression algorithms to reduce memory storage requirements for the providers. Decompression algorithms applied when the data is retrieved from memory essentially interpolate the reduced data using simple linear interpolation techniques lacking the precision necessary to reproduce the original image faithfully.

In color printing, such as with laser or ink-jet dot matrix hard copy apparatus, it may be even simply a user preference to create a print with higher resolution than the source provides in order to provide a sharper, less grainy, smoother textured image to present an overall higher quality and artistic print.

Another example of a need for resolution enhancement is during use of an image video display where one is viewing an image but would like to zoom in for cropping before printing or merely to get a closer look at a particular detail within the original image.

Thus, there is a continuing need for methods of interpolating many types of low resolution data to a higher resolution.

Image processing is a fairly well developed science of modifying and analyzing pictures, graphics designs, and the like. See e.g., *Introduction to Image Processing Algorithms*, Benjamin M. Dawson, Byte Magazine, March 1987, pp. 169–186. A variety of different approaches to image interpolation have been proposed and used. Known manner colorimetry constructs and methods of multidimensional color space data interpolation are described in the literature, such as *Principles of Color Technology*, by Billmeyer and Saltzman, John Wiley & Sons, Inc., NY, publishers, copr. 1981 (2d ed.); *Color Science: Concepts and Methods, Quantitative Data and Formula*, by Wyszecki and Stiles, John Wiley & Sons, Inc., NY, publishers, copr. 1982 (2d ed.); and *Fundamentals of Interactive Computer Graphics*, Foley and Van Dam, Addison-Wesley Publishing Company.

B-spline interpolators, such as image picture element ("pixel") replication and bilinear interpolation, are well known in the art. The main concept of B-spline interpolation is to specify an interpolating function which approximates the original image by sampling across a range of the source image data. The interpolating function is defined on a continuous-valued parameter and may be evaluated at arbitrary points. The resulting values comprise the interpolated image pixels. An important requirement is that the interpolating function must pass through the known function values from the sampled data. The order in B-spline interpolation—$2^{nd}$ order, $3^{rd}$ order, et seq.—refers to the maximum number of continuous derivatives that the interpolating function is required to have. Higher-ordered B-spline image interpolation results tend to look smoother and more continuous. Once the interpolating function has been obtained, still more computation is required to recover the desired output samples. Thus, the primary drawback is that complex, and thus costly, computation logic and data processing time is required.

In pixel replication, the interpolating function is piecewise constant. This means that each output pixel simply takes the value of the closest input pixel. Pixel replication tends to produce blocking (stair step edge renderings) or aliasing artifacts (undesirable spurious marks).

In bilinear interpolation, the interpolating function is piecewise linear; it may be obtained by connecting the known data samples with straight lines. This means that each output pixel may be computed as a linear combination of up to four input pixels. As a simple averaging algorithm, bilinear interpolation produces results that can be blurry.

Both pixel replication and bilinear interpolation perform satisfactorily for interpolating smooth textures. On the other hand, these single linear filter approaches tend to average image data across high-contrast boundaries like edges and rapid contrast change zones, causing a blocky or blurry printed result. Thus, these techniques are not especially effective in terms of edge and detail rendition.

Edge enhancement and smoothing non-linear algorithms are also known, particularly in the printing of alphanumeric text. The idea is to find edges (sharp tonal transitions, e.g, between an eye and the surrounding eye lid) in the source data and render them both continuous, rather than appearing to have steps, and sharp at the target resolution without blurring the values of pixels which lie on different sides of the edge. For example, U.S. Pat. No. 5,394,485 (Lowe et al., assigned to the common assignee of the present invention) discloses a *Method and Apparatus for Smoothed Scaling of Facsimile Images*. U.S. Pat. No. 5,270,728 (Lund et al., assigned to the common assignee of the present invention) teaches a pixel thinning methodology in a *Raster Imaging Device Speed-Resolution Product Multiplying Method and Resulting Pixel Image Data Structure*. U.S. Pat. No. 5,446, 804 (Allebach et al., assigned to the common assignee of the present invention) discloses a method for *Magnifying Digital Image[s] Using Edge Mapping* where to magnify the image, an edge map is produced for certain image boundary conditions, generating one or more additional pixels in locations among the original pixels and expanding the distances between the pixels so that the resolution of the locations of the pixels becomes the same as the original pixels.

Conversely to pixel replication and bilinear interpolations, edge enhancement and smoothing algorithms may not be very effective in terms of improving smooth textures and transition zones.

There is a need for a data resolution enhancement methodology applicable to data representative of any data structures representing functional and structural aspects of physical objects or activities where subsets of the data can be extracted from the entire data set and interpolated.

In the application of the present invention for image data processing, there remains a specific need for a method of improving low resolution data which will improve the visual quality of the entire source image across the entire spectrum of content. The method for improving resolution should be effective for both graphics images and alphanumeric text.

Data filtering as used in the present invention is well known in the art Texts such as *Fundamentals of Digital Image Processing,* by Anil Jain (copr. 1989, Prentice Hall publishers) review such techniques. Specifically for printing technology, the use of data filtering is made in U.S. Pat. No. 5,313,287 (Barton et al., assigned to the assignee of the present invention).

SUMMARY OF THE INVENTION

In its basic aspects, the present invention provides a method for enhancing an input data set, representing a contiguous construct expressible as subsets of data coordinates representative of individual elements of the set, to increase resolution of the construct to an output construct resolution data set. The method includes the steps of: choosing a first data coordinate subset of the construct; designating a set of second data coordinate subsets wherein each of the second data coordinate subsets is in a predetermined proximate relationship to the first data coordinate subset; characterizing the set of second data coordinate subsets by a first vector representative of a value related to at least one construct characterizing factor of the contiguous construct; providing a data base, the data base having groups of data filters for the at least one construct characterizing factor, each of the groups of data filters having a second vector identifying at least one construct characterizing factor data filter group directly related to the at least one construct characterizing factor such that filtering the first data coordinate subset by a second vector identified group of data filters enhances the resolution of the first data coordinate subset; comparing the first vector to the second vector; selecting at least one of the groups of data filters based on a predetermined relationship of the first vector to the second vector; filtering the second data coordinate subsets with a selected group of data filters from the step of selecting; outputting a third subset of data coordinates consisting of a plurality of filtered second data coordinate subsets; substituting the third subset for the first data coordinate subset in the construct; and repeating each step of the process for each first data coordinate subset in the construct.

The present invention also provides a method for enhancing a graphics image by computerized enhancing of input data representative of a graphics image to increase resolution and providing resolution enhanced output data, the input data and the output data representing pixels of the graphics image. In the main, this method includes the steps of: selecting a pixel to be enhanced; selecting a set of pixels circumscribing the pixel to be enhanced; characterizing the set of pixels by a first key representative of a value related to at least one visual perception factor of graphics images; providing a data base having a plurality of visual perception factor data filters for the at least one visual perception factor and each individual filter of the data base having a second key representative of a value related to the at least one visual perception factor; comparing the first key to the second key; selecting at least one data filter from the data base predicated on a predetermined relationship of the first key to the second key; filtering the set of pixels circumscribing the pixel to be enhanced with a selected filter from the step of selecting; increasing resolution of the pixel to be enhanced by substituting a plurality of pixels therefor based upon the step of filtering the set of pixels; and outputting the plurality of pixels.

In a further basic aspect of the present invention there is provided a computerized method for resolution enhancement of tristimulus color space input data, including the steps of: determining if the input data is congruent with resolution enhancement; selecting a target pixel of congruent input data represented by a first set of input data having a format of color space coordinates wherein each coordinate represents a color plane; selecting a window of pixels, each of the pixels of the window represented by respective second sets of input data having a format of color space coordinates wherein each coordinate represents a color plane, the window of pixels having the target pixel as a center pixel; providing a data base including classified groups of data enhancement filters, each of the classified groups of data enhancement filters having a first key representative of an imagery characteristic; testing each color space coordinate of the window of pixels against at least one predetermined threshold value representative of a need for enhancement in the color plane of the target pixel coordinate, and when testing of the target pixel coordinate does not exceed the predetermined threshold value, outputting a set of multiple pixels in substitution of the target pixel, the set consisting of pixels interpolated from the target pixel in a known manner, or when testing of the target pixel coordinate exceeds the predetermined threshold value, filtering the pixels of the window with at least one group of data enhancement filters selected from the data base and replacing the target pixel with a plurality of smaller pixels based upon the filtering.

Another basic aspect of the present invention is embodied in a computer memory device adapted for use with a hard copy apparatus. The device has a program for analysis and resolution enhancement of input data, the input data including digital imaging data wherein an image is represented as a matrix of pixels, the program including the steps of: determining if the input data is congruent with resolution enhancement; selecting a target pixel represented by a first set of input data having a format of color space coordinates wherein each coordinate represents a color plane; selecting a window of pixels, each of the pixels of the window represented by a respective set of input data having a format of color space coordinates wherein each coordinate represents a color plane, the window of pixels being at least partially contiguous to the target pixel; providing a data base including classified groups of resolution enhancement data filters, each of the classified groups of resolution enhancement data filters having a location vector representative of a class of an imaging characteristic related to the resolution enhancement data filters; examining each color space coordinate of the window of pixels against at least one predetermined threshold criteria representative of a need for enhancement in the color plane of the target pixel coordinate, and when examination of the target pixel coordinate does not meet the at least one predetermined threshold criteria, outputting a set of multiple pixels in substitution of the target pixel, the set consisting of pixels interpolated in a known manner from the target pixel, or when examination of the target pixel coordinate meets the predetermined threshold criteria, filtering the pixels of the window with at least one group of data enhancement filters selected from the data base, and replacing the target pixel with a plurality of smaller pixels based upon the filtering.

Yet another basic aspect of the present invention is a system for generating graphics images, including rendered alphanumeric text images, the system including a memory device for storing and operating an image resolution enhancement method. The method includes the steps of:

a) receiving a source data set of pixel data for each pixel of a graphics image, the source data having a form of spatial coordinates;

b) determining if the data set is an upscaled data set, and when the data set is an upscaled data set, downscaling the data set;

c) selecting a window of pixels, including a target pixel and at least some pixels contiguous to the target pixels;

d) comparing the variation of a spatial coordinate of the contiguous pixels to a same spatial coordinate of the target pixel with respect to a variation threshold value, and
   if no variation exceeds the variation threshold value, replacing the target pixel with a plurality of higher resolution pixels generated in a known manner and returning to step c), and
   if a variation exceed the variation threshold vale, continuing with step e);

e) calculating an image characteristic factor for each of the pixels of the window;

f) comparing the variation of the image characteristic factor for the contiguous pixels to a same image characteristic factor for the target pixel to a range of image characteristic factors, and
   if the variation is within the range, replacing the target pixel with a plurality of higher resolution pixels generated in a known manner and returning to step c), and
   if the variation is above the range, continuing with step g);

g) providing a data base of groups of data filters, each of the groups of data filters being classified by a mean vector related to the image characteristic factor;

h) calculating a cluster vector for the window related to the image characteristic factor;

i) sequentially comparing the cluster vector to each mean vector;

j) selecting at least one group of data filters based on a predetermined relationship of the cluster vector to at least one mean vector;

k) applying the at least one group of data filters selected in step j), generating a plurality of pixels to replace the target pixel;

l) replacing the target pixel with the plurality of pixels;

m) sending the plurality of pixels to an output device for generating a resolution enhanced visual image, and n) returning to step c), and continuing the process until all pixels of the image have been selected.

It is an advantage of the present invention that it provides a data resolution enhancement methodology applicable to data representative of any data structures representing functional and structural aspects of physical objects or activities where subsets of the data can be extracted from the entire data set and interpolated.

It is an advantage of the present invention that it provides a method of improving low resolution imaging data which will improve the visual quality of the entire source image across the entire spectrum of content.

It is an advantage of the present invention that it produces high resolution data interpolations from low resolution source data with relatively moderate computational requirements.

It is an advantage of the present invention that it provides an input image resolution synthesis that provides an output image of improved visual quality, sharpness, and tonal smoothness.

It is a further advantage of the present invention that it is applicable to low resolution image data generated from substantially any source.

It is a further advantage of the present invention that application to imagery data that includes rendered text, such as text rendered into the bitmaps of logos or icons, is significantly enhanced, improving readability.

It is still another advantage of the present invention that it can use either a full interpolation or an expedited interpolation to reduce data processing time.

It is yet another advantage of the present invention that in a use for raster data printing, computation time can be performed during raster data transmission, thus adding no real time printer delays.

It is still another advantage of the present invention that it is a closed-form computation, eliminating expensive iterative optimization computation costs.

It is still a further advantage of the present invention that it produces a nonlinear operation through the selective combination of linear operators or data filters.

It is a further advantage of the present invention that it can be implemented using independent parallel operations at each pixel of an image.

It is a further advantage of the present invention that it combines data interpolation techniques with data restoration, image smoothing and sharpening results such that the output resolution is $\geq 1$ times the input resolution.

It is an advantage of the present invention that it can be implemented as a computer program.

Other objects, features and advantages of the present invention will become apparent upon consideration of the following explanation and the accompanying drawings, in which like reference designations represent like features throughout the drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 1A is a schematic block diagram of a system implementing the present invention.

FIG. 1 is flow chart of an exemplary computer application in accordance with the present invention.

FIGS. 2A–2D combined are a flow chart detailing the resolution synthesis methodology of the present invention as incorporated into the process of FIG. 1.

FIG. 5 is a schematic representation of an exemplary data base used in accordance with the present invention as depicted in FIGS. 2A–4.

Figures 2A, 2B:
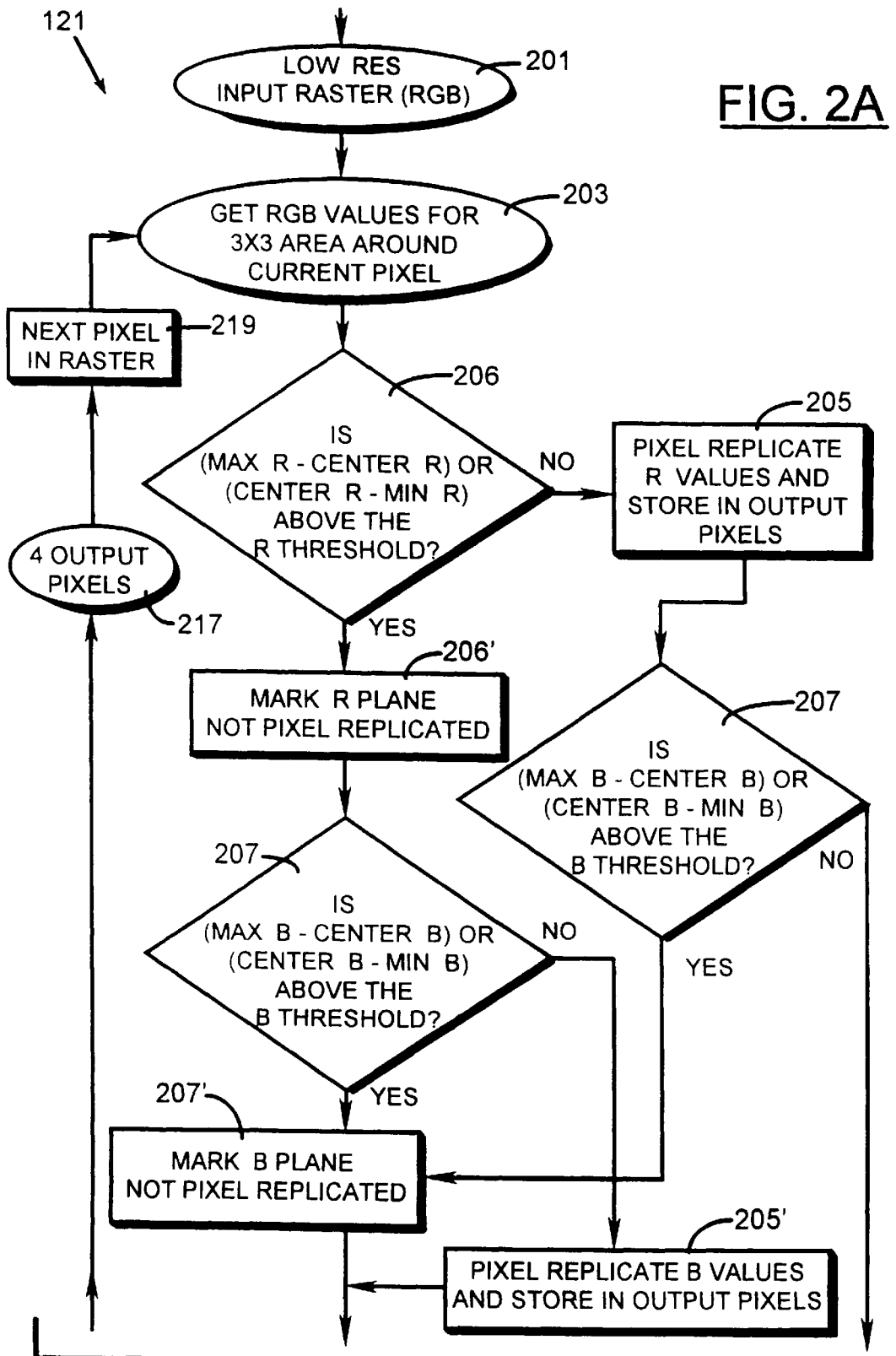
Figure 2B:
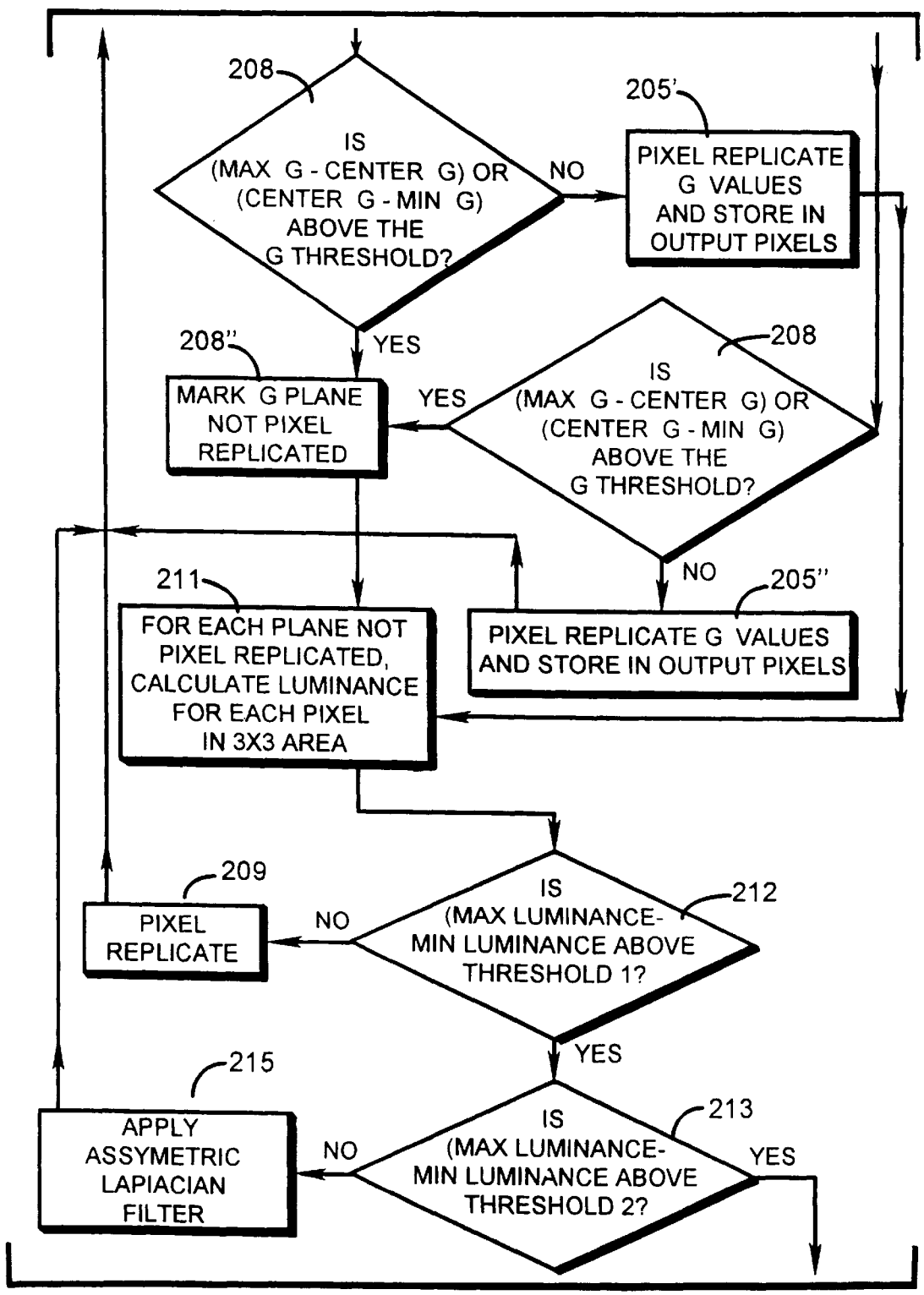

The drawings referred to in this specification should be understood as not being drawn to scale except if specifically noted.

DESCRIPTION OF THE PREFERRED EMBODIMENT

Reference is made now in detail to specific embodiments of the present invention which illustrate the best mode presently contemplated by the inventors for practicing the invention. Alternative embodiments are also briefly described as applicable. In order to aid understanding, the invention is described with respect to an exemplary embodiment in terms of a computer application for interpolation of a data set for a graphics image. This is in no way intended as a limitation on the practical use of the present invention nor should any be implied therefrom. The process described herein can be implemented in software as stored in hardware memory (RAM, ROM, and its equivalents), disk-type memory, tape-type memory, in an application specific integrated circuit (ASIC) including firmware versions of the program process, or other general computing storage means as would be common to the state of the art at any given time. In a software version, the program can be implemented in ANSI C-language software code or the like. Titles of subsections of the Description are provided merely for convenience of the reader and are neither intended to define limitations nor describe specific aspects of the invention; no such intention should be implied.

General

FIG. 1A is a depiction of a system 100 implementing the present invention. A data source 102 has an output of low resolution data 104. Before putting the data 104 into an output device 106 (e.g., a color printer) storage apparatus 108 from which an output version 110 of the input data 104 can be generated, the data 104 is analyzed. When the input data 104 is found to be congruent with the processes of the present invention, further analysis, data enhancement, and resolution synthesis steps 112 can be performed. In the process of analysis, other known manner data enhancements can also be employed to conform the output data 114 to the output device 106 data resolution capabilities, such as a variety of user output options provided in a color printer.

FIG. 1 is a flow chart of the overall process of the exemplary embodiment of the present invention where low resolution imaging data (e.g., FIG. 1A, 104) is provided as an output data set 101 from a computing source. For example, a computer user may wish to download a photograph discovered during an Internet search. [As an alternative use example for state of the art technology, a WEBTV television viewer—where WEBTV becomes a type of simplified, dedicated, computer workstation—may decide to print an advertisement page of interest which includes rendered text and images.] The original source imagery input data set 101 is thus assumed to be in a low resolution form, e.g., less than 120 dots per inch ("dpi") [or, for the alterative example, an assumed aspect ratio of 70 dpi for a WEBTV screen bit map].

In the main, the present invention provides a resolution analysis and synthesis algorithm that takes low resolution source image input data set 101 and synthesizes a high resolution (e.g., greater than 300 dpi) version output data set 114 for printing, transforming a low resolution input image into a high resolution output image. The algorithm is performed by characterizing a multi-pixel area, or "window," subsuming a "target," or "current," pixel—the pixel to be enhanced—and then applying a set of spatial filters to the area based on the window characterization, or classification, with respect to a given data base having relevant class filters. The output of the resolution synthesizer is a set of multiple pixels for each target pixel, thereby representing the input pixel in a higher resolution synthesized version. The filters are chosen from a stored data base, or specific applicable data base for each type input device, i.e., output from a computer, WEBTV, scanner, digital scanner, digital camera, video camera, and the like, created specifically for each input device or set of input devices. [Except as to form of the filtering data in the data base(s), a further detailed description of how such tailored data bases are created is not essential to enabling a person skilled in the art to understand the present invention; i.e., while use of such data bases is made by the present invention, creation of the data base is not an inherent component of the data analysis and resolution synthesis process. In other words, the present invention is useful with supplied data bases as will be described hereinafter.]

Input Data Analysis Preprocessing

It is well known that computer programs must be operating system ("O/S,") compatible—e.g., Windows95™ O/S compatible programs. Therefore, an O/S compatibility check 103 is performed. If the source computer O/S is not compatible with the resolution synthesis program, the input data 101 is upscaled 115, 117, if necessary, to an image rendering output device resolution capability selected by the user and sent 105 directly to an output device controller, e.g., an HP™ DeskJet™ printer controller board.

Figure 7A:
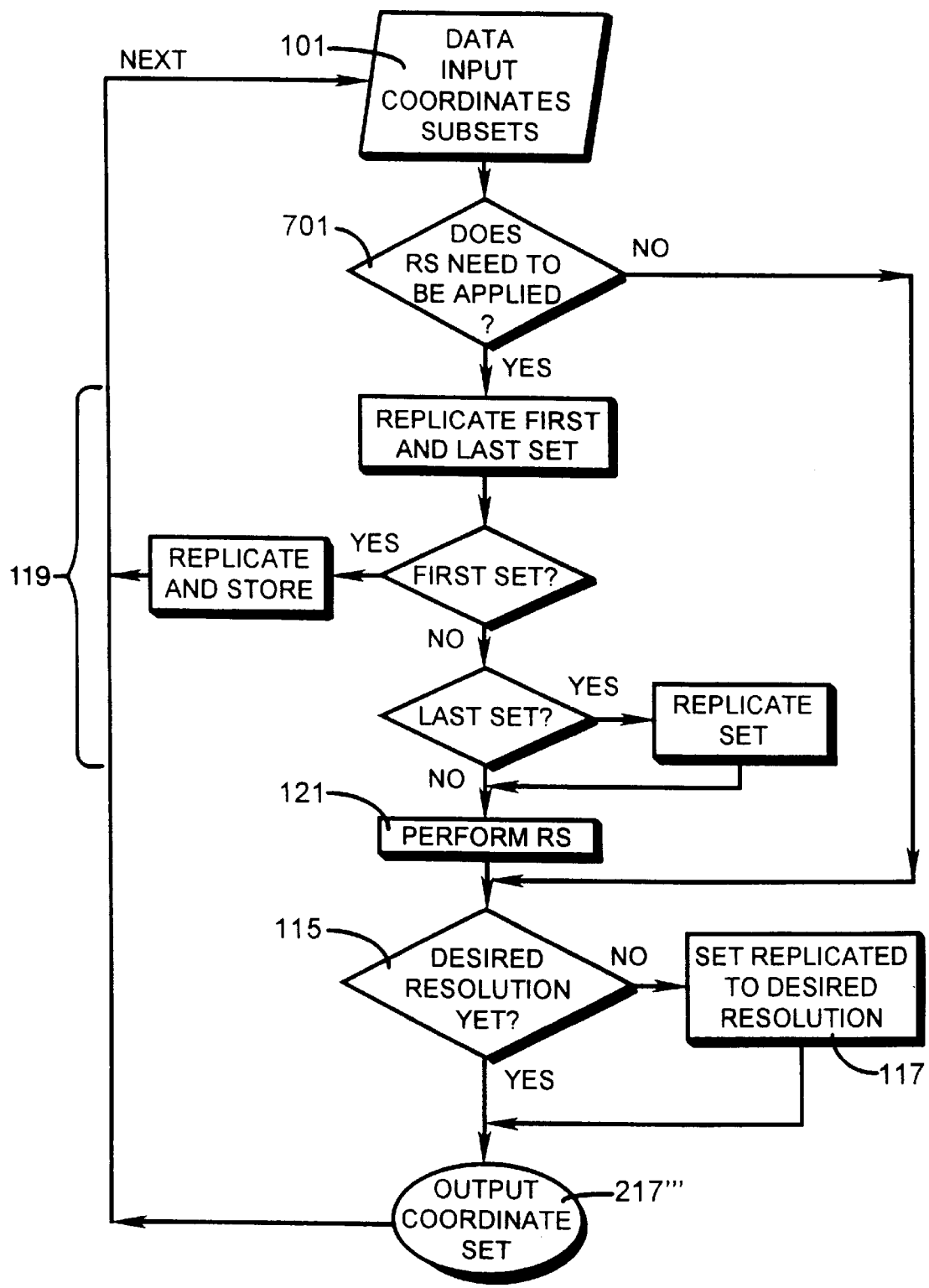
FIGS. 7A and 7B are a generalized, top level, flow chart for the methodology of the present invention as shown in FIG. 1.
Figure 7B:
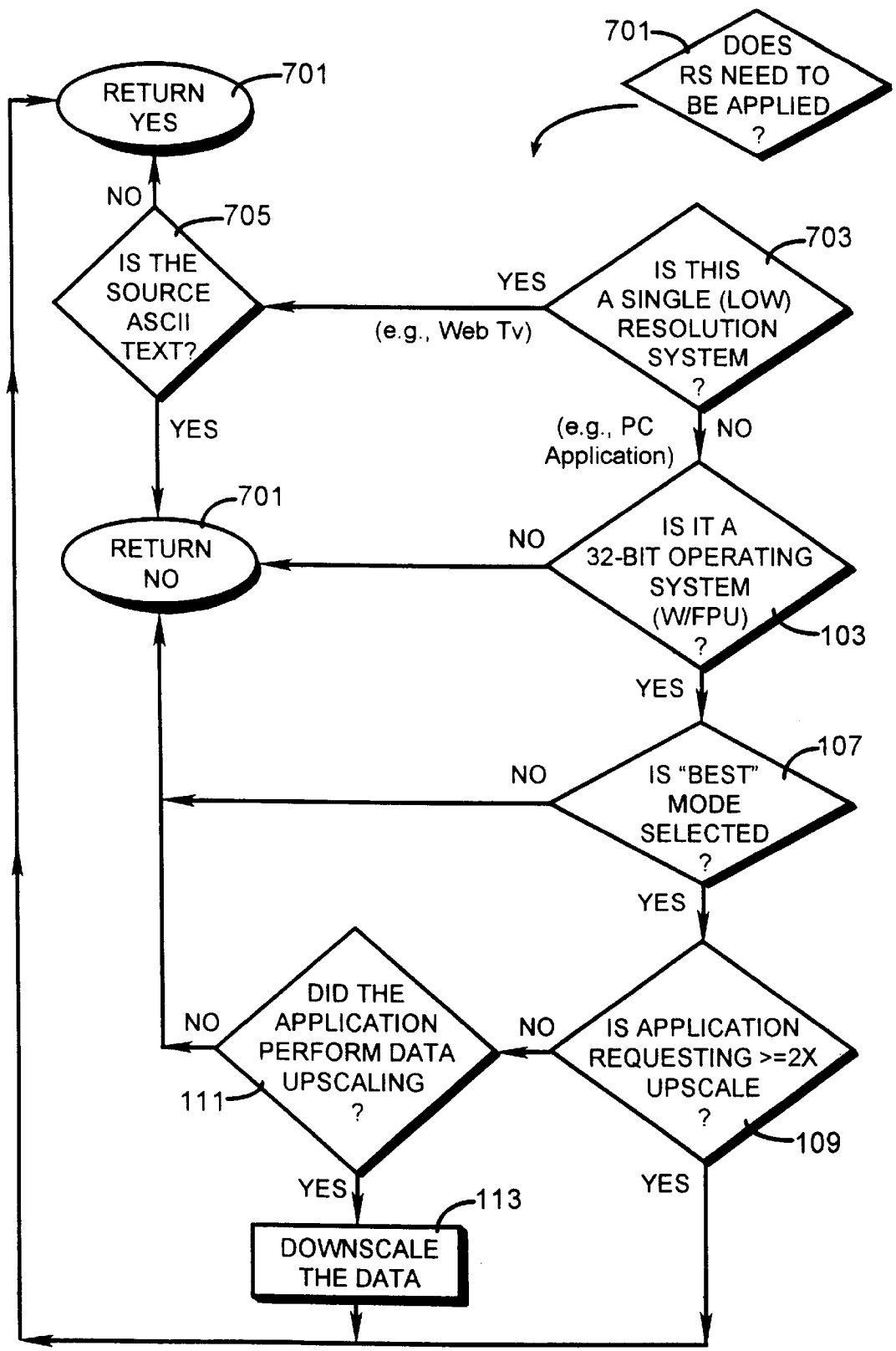

A more general, alternative embodiment of the present invention is provided in a flow chart of the top level methodology in FIG. 7A, with detail of a predetermination 701 as to whether to apply resolution synthesis shown in FIG. 7B. Note that for an implementation of the present invention to another embodiment, e.g., a digital camera as an image input data source to an RGB video monitor as an image display, such program compatibility is built in or otherwise not an issue, generally making this step irrelevant. For an implementation of a single, low resolution data output, like WEBTV (FIG. 7B, 703), the initial check as to whether to apply the algorithm of the present invention to the input data set 101 might be to determine if the printable screen is ASCII code only, e.g., e.mail text, 705; if so, resolution synthesis is not applicable and the text data can be upscaled 115, 117 and sent directly to the printer.

Returning to FIG. 1, if the compatibility check 103 is passed, a print mode check 107 is performed. A user may simply want a fast, printer efficient, low quality copy as a rough draft of the source image [or such as of the above the exemplary WEBTV advertisement] and select 107 a DRAFT mode copy. Or, the user may want a high resolution copy of, for another example, a decompressed JPEG image, and thus would select 107 a BEST print mode copy.

If the user has selected 107 BEST print mode output, but the computer has not requested a resolution upscaling 109, a check is made to determine if the source data was already upscaled 111, e.g., the decompressed JPEG file. For example, decompression may have already upscaled the true source data by a factor of two or more via a simple pixel replication routine (see Background of the Invention section, supra). Alternatively, the source may have stretched the data bidimensionally to fit the output device format [e.g., the Internet provider may know that pixel data needs to be upscaled in order to render a 6×9-inch print of the current screen display rather than a 2×3-inch print on the 8.5×11-inch printer paper]. However, the algorithm used by the application to pre-upscale images is likely a simple and less effective prior art technique. Since a goal of the present invention is to provide superior upscaling to those techniques while providing an output device resolution matched data set, reversal of such a prior upscaling, or downscaling 113, prior to further analysis and resolution synthesis 121 provides superior final image results.

If the computer has not issued an upscale request 109 and the source data is not upscaled data 111, a check of resolution 115 is performed. If the resolution matches the resolution of the printer, e.g., 300 dpi, the data is sent 105 to the imaging controller. If the resolution does not match the selected printer output capability, another enhancement, such as known manner 2-dimensional pixel replication 117, is used to match the data to the printer resolution before the data is sent 105 to the imaging controller.

If the user has selected BEST mode printing 107 and the computer has issued an upscale request 109, the data is prepared for resolution synthesis 121.

Along image borders, there are pixels which are not "centers" of a window of pixels. Therefore, pixel replication of the nearest neighboring pixel value is used to adjust 119 the outer borders of the image in order to provide data points which will be used in the resolution synthesis 121 processing of the image in accordance with the present invention. In other words, a new outer border is created so that actual border target pixels of the source image can be enhanced.

Resolution Synthesis

FIGS. 2A–2D provide a flow chart of the resolution synthesis ("RS" hereinafter) data enhancement process steps. In this exemplary embodiment, the RS algorithm is used to generate a version of a source image enhanced by a factor of greater than two, e.g., 96 dpi to 300 dpi. A two-times enhancement is performed by the RS algorithm itself and any remainder upscaling is processed by another known manner technique such as pixel replication (see FIG. 1, flow steps 121, 115, 117, 105).

Pixel Windowing

Figure 3:
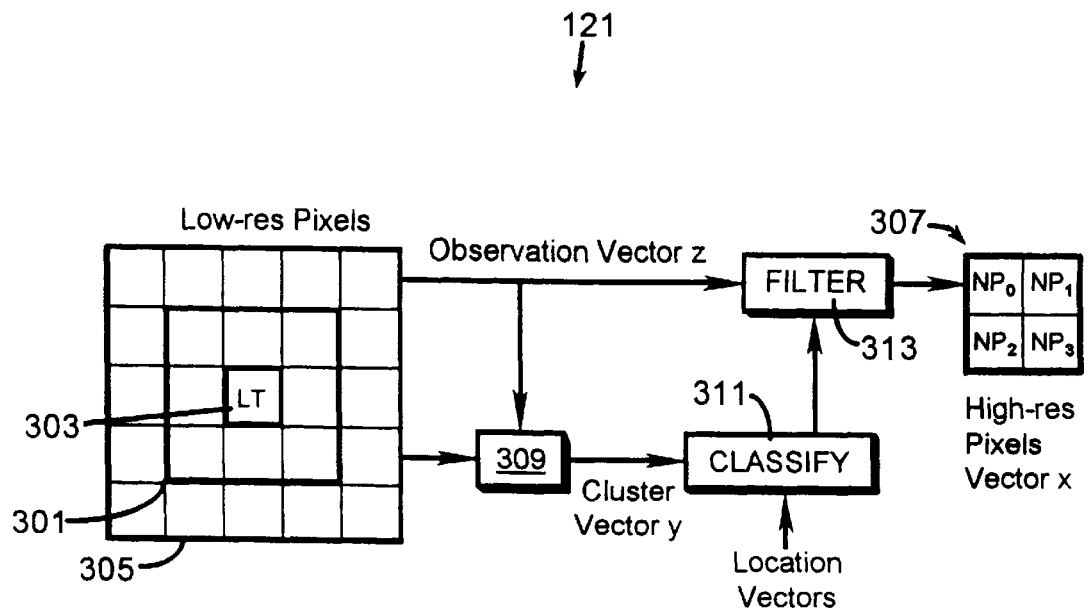
FIG. 3 is a schematic block diagram of a pixel resolution synthesis interpolator in accordance with the present invention as described in FIGS. 2A–2D.

The RS algorithm for image resolution enhancement implementations operates on a pixel-by-pixel basis. A low resolution, raster data subset, input triplet (R,G,B, or other tristimulus color space data coordinates) for a pixel of the input data to be enhanced is selected 201 from the source image data set. As shown in FIG. 3—a simplified block diagram of an interpolator—the algorithm is performed by characterization 309 and use of a multi-pixel pixel area, or "window," 301 encompassing the target pixel 303. In the exemplary embodiment of extended forms of resolution synthesis, infra, the interpolator is a minimum mean squared error interpolator. Other forms of an interpolator may be implemented within the scope of the present invention.

For a two-times ("2×") enhancement—viz., two dimensionally from one input pixel to four output pixels—selection 203 (FIG. 2A) of a window 301 (FIG. 3) of 3×3 pixels has been found to present an adequate sample of a local region of an image to be enhanced. Note however that a larger window 305 (e.g., 5×5 pixels) could be used in the characterization, filtering, or both routines of the present invention. In experimenting specifically for ink-jet printing implementations, it has been found that use of a larger window both for characterizing a target pixel 303 and for filtering a window may not improve the printed image noticeably within the limitations of human visual perception. Selection of too large a window may lead to the printing of undesirable artifacts if the variations of image characterizing factors is great within the selected window. However, such larger windows may be effective in another specific application (see Background section, supra). Similarly, it is possible to select and use a "double window," one for characterization and another for data filtering. In the alternatives shown in FIG. 3, the outer 5×5 pixel window 305 of the image that could be subject to filtering is denoted as observation vector z, while inner 3×3 pixel window 301 is used to characterize the nature of the target pixel 303. Thus, the process is adaptable to optimization for different input data sources and output data devices.

The function of the 2×-RS algorithm is to replace a single low-resolution pixel like target pixel 303 with four, interpolated, high-resolution pixels 307, denoted vector x. If pixel 301 in FIG. 3 is $\frac{1}{96}^{th}$-inch by $\frac{1}{96}^{th}$-inch, pixel 307 will comprise four cells of $\frac{1}{192}^{nd}$-inch by $\frac{1}{192}^{nd}$-inch each. More generally, for enhancement by a factor E (where $E \geq 1$), the low-resolution pixel would be replaced with $E^2$ pixels.

Resolution Synthesis Bypasses

Referring again to FIGS. 2A–2B, in order to speed overall processing, prior to beginning resolution synthesis steps of the data resolution enhancement process, a determination is made as to whether to apply the RS algorithm. For a selected 203/219 3×3 window, color data, in a plane-by-plane analysis—i.e., R, G, B individually, either in serial or parallel processing—is checked to determine what spectrum of variations of each color plane exists within the window and whether it warrants resolution synthesis. A predetermined threshold value, or a range of thresholds, of color variation based on the specific data base implementation is computed for each color. This range would vary plane-to-plane since the human visual perception capability is different in each; e.g., variations in blue are less perceptible than for red or green. If a color, z, has possible color space data triplet coordinate values, $\{z_r, z_g, z_b\}$, each having a value ranging from 0 to 255, the differences between the highest and lowest value in the data set for the window and the target pixel value are calculated 206, 207, 208. If the difference is greater than the predetermined threshold for that color plane, analysis and resolution synthesis will be continued 206'/211, 207'/211, 208'/211, color plane-by-color plane for each target pixel.

For example, in an analysis of a given window, there is first a check to determine if there is enough red color variation to warrant resolution enhancement by comparing the difference between the center target pixel red data triplet coordinate and the maximum value red data triplet coordinate to the predetermined threshold. Assuming the target pixel has a data triplet of {55, 22, 1} and the maximum red data triplet of other pixels in the window is {255}, the calculated difference is (255−55)=200. If the threshold for variation is preset at 75, resolution enhancement in the red plane is warranted. Similarly, the minium value is red data triplet coordinate would be compared.

If the differences are each below the predetermined threshold for a specific color plane, it is an indication that resolution synthesis is not warranted for that plane, meaning that visually perceptible differences made by taking the processing time to accomplish a complete synthesis in accordance with the present invention will not be accomplished to a greater extent than applying some faster known manner of interpolation. In other words, the final enhanced output image will be substantially the same using an enhancement processing shortcut Therefore, when not warranted, a 2-dimensional pixel replication, or other known manner enhancement, is performed in that plane 205, 205', 205" and the value stored for the next output pixel set 217.

If the difference is above the threshold 206–208, indicating enhancement is warranted 206', 207', 208", the process continues on a plane-by-plane basis. Next, a check 211–213 is made of imaging characteristic factor variation for the entire window data subset select 203, again to determine if resolution synthesis is warranted. For example, while a target pixel may vary from the surrounding window as determined in steps 206, 207, 208, if the window 301 itself has little overall color variation—e.g., the image of the white of an eye—applying resolution synthesis could be superfluous to the visual appearance of the final output image and so it can be bypassed in order to speed data processing. In the preferred embodiment, a grey scale luminance value is calculated 211 for the target pixel 303 and each pixel in the window 301.

For the current preferred embodiment useful in computer peripheral color printing, it has been found that suitable results are achieved in a reasonable real time calculation by using grayscale values even though manipulating color data of a form comprising tristimulus color space triplets such as {Red, Green, Blue} or {Cyan, Magenta, Yellow}. Each data triplet value is run through the calculations individually as if it represented a grey scale data coordinate. In other words, each color plane data coordinate of a triplet is treated individually as if it were a single luminance value in grey scale:

$$L*z_{target\ pixel} = 0.299 z_r + 0.587 z_g + 0.114 z_b.$$

It will be recognized by a person skilled in the art that a data base using true color space data can be created and used to created tristimulus color space vectors and data filters but at the cost of adding significantly more memory, logic, and data processing time. As a variety of such techniques are already known in the art, use of true color space data rather than grey scale luminance values is not beyond the scope of the present invention, but no further detail is necessary to an understanding of the present invention. Note that selection of grey scale luminance makes the process suitable for true grey scale image enhancement, e.g., for resolution enhancement of black and white photographs.

The changes in luminance (Max L*−Min L*, where L* is the standard nomenclature for luminance), over the target pixel window of pixels 301 is calculated and compared 212 to a predetermined threshold. The difference is compared to a first threshold of a range of luminance values. If it is above the first predetermined threshold, the process proceeds. If not above the first threshold, meaning very little variation in the window 301, another simple known in the art enhancement, e.g., pixel replication, or the like, is applied 209. With the process proceeding, the entire window luminance variation of the window is checked 213 against a second predetermined threshold. In other words, a test is made as to whether the average luminance of a window 301 is within a range of color variation—meaning some but not a great deal of variation. Thus, if the difference 213 is above the lower limit, first threshold, of the range of color variation 212 but below the upper limit, second threshold—meaning subtle color variations within the window—a secondary, improved enhancement such as a asymmetric Laplacian filter is applied 215 to the target pixel. That is, within the luminance check range, resolution synthesis may not been found to be warranted, yet known manner enhancement is desired and therefore applied. If in comparison the window luminance variation exceeds the second threshold 213, the process proceeds.

After the R,G,B plane-by-plane analysis of the current pixel, if no resolution synthesis is warranted, the output replacement pixel set is sent 217 and a next target pixel and window data is selected 219, 203.

Window Characterization

Figure 4:
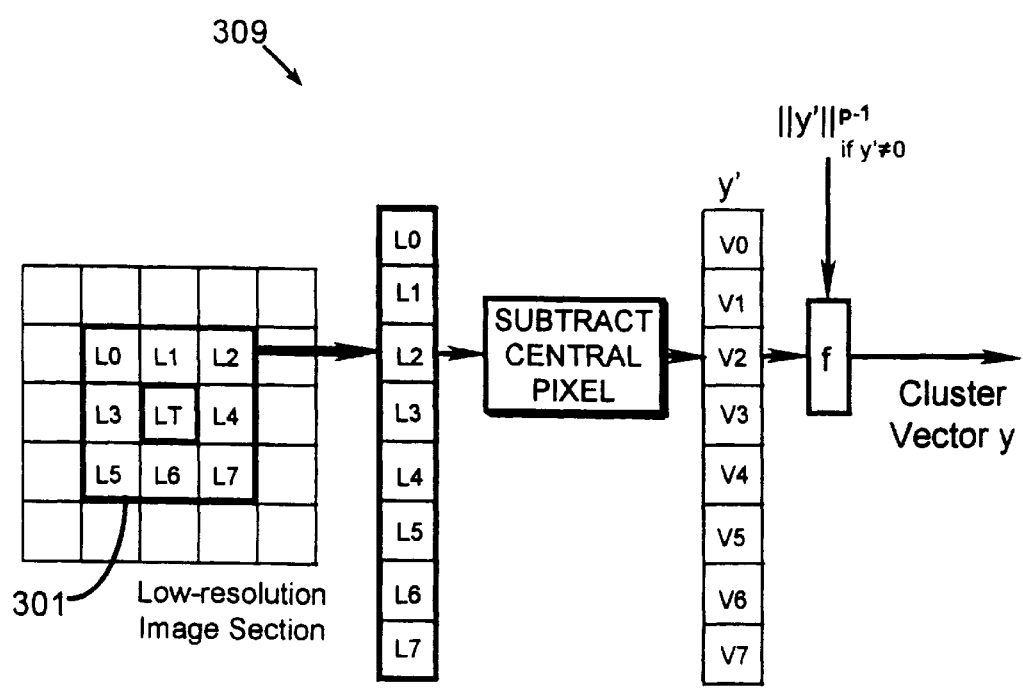
FIG. 4 is a schematic block diagram of a detail of FIG. 3.

Turning now to FIGS. 2B and 3, assume a window 301, or at least one color plane of the current pixel 303, is selected for resolution synthesis. For the printing implementation of the exemplary embodiment of the present invention, the target pixel window region 301 is characterized 221, 309. The characterization process is depicted in more detail in FIG. 4. Each axis in the 8-dimensional space L0–L7 has a designated range of 0 to 255. The target pixel LT and eight surrounding pixels L0–L7 were converted to gray scale luminance values; now the central target pixel LT value is subtracted:

$$Ln - LT = Vn,$$

where

Ln=luminance value for surround pixel n,

LT=luminance value for the target pixel, and

Vn=relative luminance values of LT to Ln.

This provides an 8-dimensional vector denoted the cluster vector y (also sometimes referred to hereinafter as a "window key" or "cluster key"), which is a representation of the given pattern, tone independent, of the window data for the entire pixel window 301. In other words, a real time derived cluster vector y contains salient image data for the pixel window 301. Cluster vectors y are assumed to be distributed as a multi-variate Gaussian mixture via this luminance variation value characterization.

One cluster vector y is obtained for image data characterization, computed using the three color planes. This results in the same characterization and filter class selection for all three planes. For example, suppose the red plane only warrants resolution synthesis, FIGS. 2C–2D. The green and blue planes are interpolated in some known manner 205, 205', 205". The cluster vector y is used for red plane resolution synthesis is a product of the red, green and blue plane analysis and the filtered data vector is from the red plane.

From the window of pixels, a non-linear transform factor, "f" denoting a projection vector, is used to obtain the final cluster vector y in order affect how well the resolution synthesis algorithm renders edges and detail at the target output resolution. The format of the V0–V7 window characterizing key is in a comparable format to the data base location vector key. A non-linear transformation "f" can be may be applied.

In the exemplary embodiment:

$$y = f(y') = y' \|y'\|^{p-1} \text{ if } y' \neq 0, \text{ or else}$$
$$= 0,$$

where p is, e.g., a scalar of any predetermined value between zero and one.

In the preferred embodiment for digital image enhancement, p=0.25. Geometrically, the purpose and effect of this of this scaling is to warp the space of cluster vectors so that edges of different magnitude but similar orientation or shape are grouped together. That is most vectors are clustered together based upon direction, relatively independent of magnitude. The result is that edge and detail classes can be accentuated during characterization, which allows for better discernment of such behaviors. For example, for use in pixel enhancement where a tristimulus color space coordinate is empirically in the range of 0 to 255, the vector can be partially normalized by computing the length and dividing each element by length^0.75 (dividing by length would completely normalize the vector, but dividing by length^0.75 reduces the range to about minus four to plus four ($\approx$4 to ~4); the result is that any vector within a threshold within the range, e.g., 0.34 units from the cluster vector y, is included. That is, any location vector class within this distance is also included in the filtering when Extended RS, infra, is performed). Again, this makes the process adaptable as specific scaling can be tailored to particular implementations of the resolution synthesis process based on the type of input data being enhanced.

Based on what is a design expediency for a particular implementation of the present invention, a decision 223 is made as to whether to perform a time-efficient resolution synthesis or a full resolution synthesis.

Filtering

As depicted in FIG. 5, at least one data base of filters, comprising groups of input data relevant filters, denoted as "classes," is provided. Generally, the data filters will be for some related source input data contiguous construct characterizing factor. In other words if the input data describes a construct which can be broken down into specific elements, the data filters of the data base used for enhancement will relate to aspects of those specific elements where improving data resolution will enhance the overall construct.

In this exemplary embodiment, the provided data base is one hundred and one image resolution data filters (the number of filter classes is constrained only by storage capacity of the particular implementation), each class comprising groups of four data filters that have been generated and classified based upon imagery test data. For the exemplary embodiment, each class is a group of four data filters relating to a luminance grey scale pattern.

Each class 0–100 is provided with a classification location vector, also denoted the class mean vector, also denoted "location keys" because of their function. These classification location vectors, are also 8-dimensional vector representations distinctively assigned to each class of groups of four stored filters. In other words, each of the location vectors, provide a shorthand definition, or other similar pointer, of a specific filter class in the data base. The data base keys use the same definition scale as used for the cluster vectors y. Thus, simple pattern Euclidian mean comparison of a location vector to each derived 8-d cluster vector y can be used to rapidly find a pertinent set of filters for any pixel window 301. For this exemplary embodiment, the threshold is the smallest squared Euclidean distance between the current cluster vector y and all of the location vectors of the current data base plus a constant representative of the desired enhancement quality versus the desired real time performance.

Efficient Resolution Synthesis

Figure 2C:
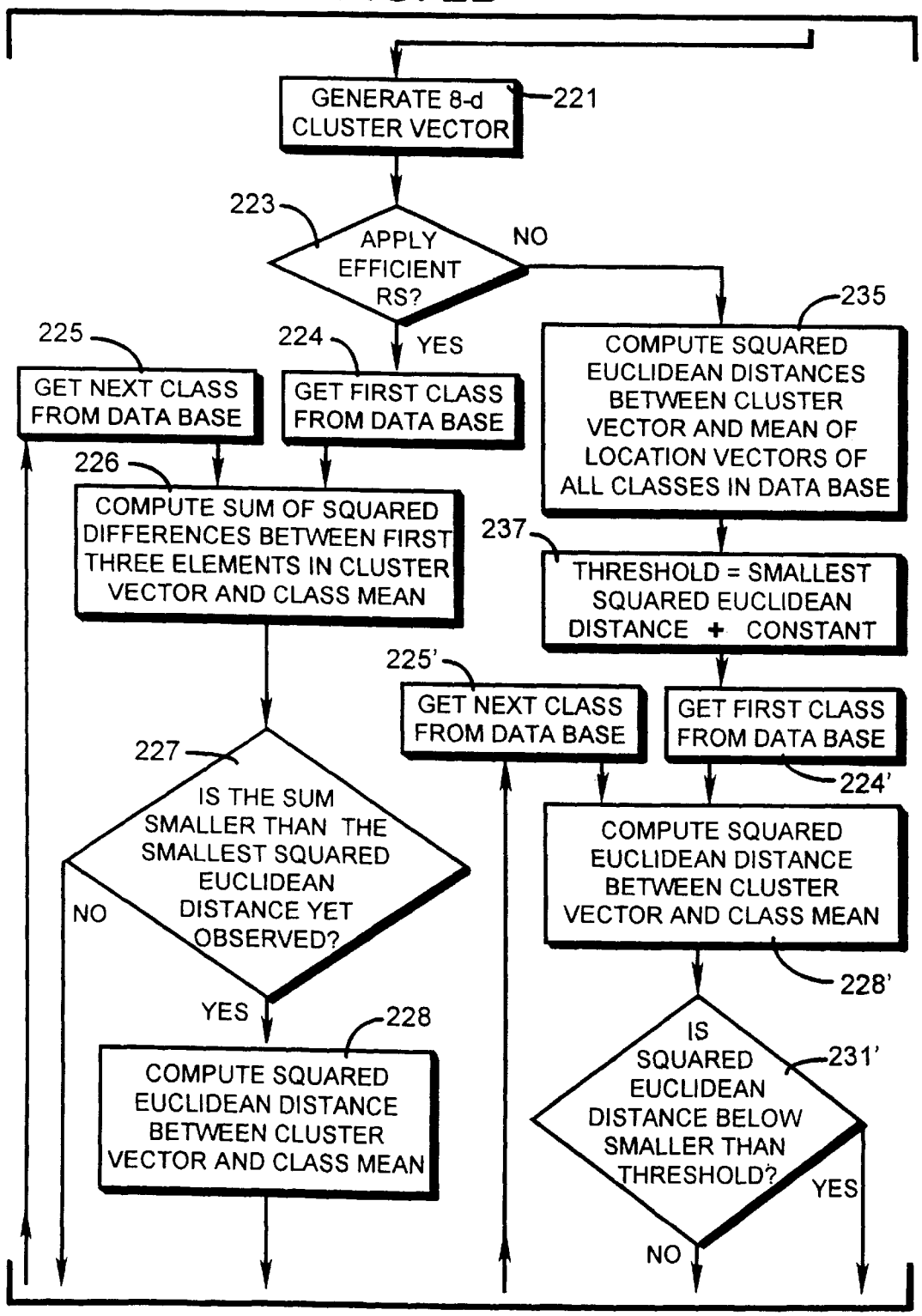

In FIGS. 2C–2D, the vector comparison steps used in the preferred embodiment are depicted as numbers 226–231. Other meaningful comparison calculations can be derived based upon a particular design implementation.

A threshold for vector distance is used for filter selection 231. A predetermined value relative to the data base in use is set. That is, when a comparison of a cluster vector y and a filter class vector determination of applicability 229 finds a closer match than a previous comparison, a comparison to a predetermined threshold 231 is performed.

Returning to FIG. 2C, assuming efficient resolution synthesis has been selected 223, sequentially each next class of the data base (FIG. 5, Class #0–100) is selected 234, 225, beginning with the first class 224, for comparison 226–231 to the cluster vector y to the filter class set location vectors. Again, threshold tests are performed 226–231 to determine if a particular filter set under scrutiny is applicable to the current pixel and window. If not, the process loops until the first class filter set meets the vector difference threshold criteria. The first class filter set which meets the threshold criteria—viz., the keys match—is selected and applied, providing the replacement output pixels 217. A new target pixel is selected 219 and the process repeated. Since the filter groups stored in the data base are not necessarily linearly related, selecting the first key matched class that is close enough (not necessarily closest) as the group of filters to be applied uses the shortest processing time in convergence based on fixed threshold to key distance search.

Note that if no selected class of data filters meets the threshold, the class with the lowest vector distance between the cluster vector and the class mean vector selected 229, 230 is used 231, 234. The data base is thus used such that at least one class will always provide a match (231, 232, 233 or 230, 231, 234, 233) of a set of four filters to the current pixel window for any input data subset Again, during the processing efficient form of resolution synthesis, exactly one class will always provide a match.

Returning to FIG. 3, the filters selected by classify comparator 311 of the cluster vector y to the data base location vectors are used in filtering 313 to replace each target pixel with a set of high resolution pixels 307, designated vector x. Each filter generates a new, higher resolution output pixel. The first selected data filter, $F_0$, of a matched set of the selected class is applied to the data of the 3×3 window, generating new output pixel, $NP_0$, FIG. 3. The second selected data filter, $F_1$, is applied to the data of the 3×3 window, generating new output pixel, $NP_1$. The third selected data filter, $F_2$, is applied to the data of the 3×3 window, generating new output pixel, $NP_2$. The fourth selected data filter, $F_3$, is applied to the data of the 3×3 window, generating new output pixel, $NP_3$. Thus, a replacement set of pixels 307 having a 2-dimensional, double resolution of the original pixel has been generated for the target pixel 303.

Extended Resolution Synthesis

Returning to FIG. 2C, step 223, a more thorough, full resolution synthesis may be warranted by a specific implementation or a particular desired effect output. When a more extensive resolution synthesis is warranted, or requested by the application program generating the source image input data or by the user, an optimum threshold and filter group can be derived and used. The number of classes used for filtering is not fixed, but locally adaptive and the thresholds to be used are computed.

First, a threshold for filter group selection is computed 235, 237. In the exemplary embodiment, the squared Euclidean distances between the cluster vector y and the mean of the location vecotrs of all classes in the data base is computed. The threshold for the current pixel is then the smallest squared distance plus a constant. For example, starting with the closest matching location vector:

$$threshold = 2.0 * sigma\_factor * sigma\_factor * variance,$$

where $$sigma\_factor \text{ is } 1.0 \text{ and variance is } 0.172 \text{ for } 2\times \text{ resolution upscaling.}$$

Again, cluster vectors y for each current, target, pixel are sequentially selected 224', 234', 225' and compared 228', 231' with the class mean vectors of each group of filters (as in steps 224–230). In this embodiment, the time is taken to calculate all of the difference values between the cluster vector and every class mean vector in the data base and relating all of those calculated difference values to the threshold 231' (as in step 231). For each matching class of groups of filters—those below the calculated threshold 237—the location vectors are stored step 239. Once all of the groups of filters in the data base have been considered 234', viz., "No Classes Left," an optimum filter set is calculated 241.

Figure 8:
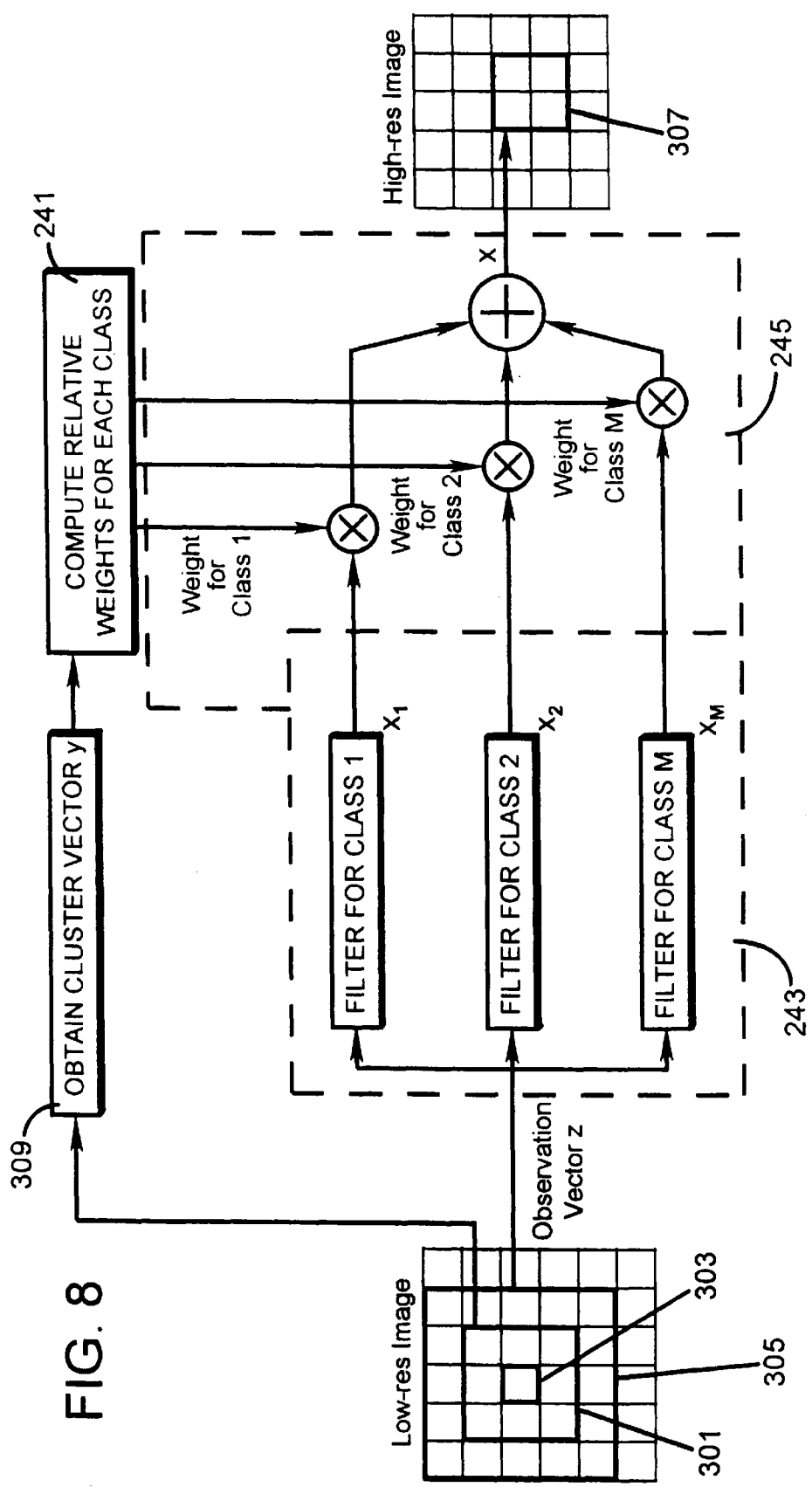
FIG. 8 is a schematic diagram of a weighted filter process alternative of filter application as shown in FIG. 3.

Some classes will be closer to the current vector then others and weighted in accordance with the probability of being a most appropriate filter group for the current target pixel enhancement. Therefore, as depicted in FIG. 8, the stored groups are weighted 241 (FIG. 2D), where the sum of the weighting factors for class 1 through class M is one, where M is the total number of classes in step 239. The filters will be used to in proportion to the difference between each class mean vector and the cluster vector for generating an optimum a 4-filter group. The weighting for the filter group for each particular class is dependent on the distance between the cluster vector and the location vector. This weighting determines how much impact the filter for this class will have on the output pixels. The weighting falls off with distance following a Gaussian distribution:

$$weighting = w_i = \frac{\Pi_i * e^{(-0.5 * distance\ sq./variance)}}{\Sigma_{selected\ classes}(\Pi_i * e^{(-0.5 * distance\ sq./variance)})}$$

where

"$\Pi_i$" is a predetermined magnitude for a class.

From this weighting (or other similar weighing factor as would be known to those skilled in the art), optimum impact filter sets can be generated. For each stored 239 location vector, the groups of filters from each designated class are applied 243 to the window as in the efficient resolution synthesis path described above. From the sets of pixels thus generated, an optimum set of output pixels is interpolated 245 to generate a single set of new real time generated optimum pixels (307, FIG. 3) for the pixel window under analysis. Again, a set of smaller, higher resolution output pixels 307 are output 217 in replacement of the target pixel and the process returns to analyze the next target pixel of the image. Note that this interpolation can be applied either to the filter sets or to sets of output pixels in order to derive the final four replacement pixels. This optimization alternative for resolution synthesis adds computer processing cost to the process.

Conclusion and Some Alternatives

Resolution synthesis according to the invention is locally adaptive. As in the exemplary embodiment, a different set of filters may be used to interpolate each target pixel of the source data. Each 2×2 output pixel is created by adding the effects of each selected filter in turn. The effects of each filter are scaled by the filter weight which was based on how close the cluster vector y matched the filter's mean vector, each being a representation of some imaging characterizing factor of the window of pixels currently being analyzed. While an averaging of all matched filters or a full interpolation for each class is possible, it is computationally intensive. Therefore, for a practical implementation an average of only 1 or 2 filters is applied. Again, in the most real time efficient resolution synthesis, merely the closest filter or the first filter having a location vector matched closely enough to a predetermined tolerance of the cluster vector might be selected and used. While strictly speaking such reduced interpolations are sub-optimal, depending on the device implementation, the results may be nearly visually equivalent. The implementor must decide what a sufficient number of filters and interpolation method provides a suitable output.

Thus, in the image processing mode practiced for commercial efficiency, threshold-meeting close filters are applied as is. Note, however, further interpolation between filters in the data base could be implemented. As previously detailed, a weighted averaging could be used to turn a plurality of selected filter classes into a new interpolated filter in real time, the optimal interpolation being computed as a combination of the outputs of all of the interpolating filters. However, such a model filter must have enough classes to represent a Wide variety of textures, which may require excessive computation for an acceptable commercial product. Another alternative contemplated by the inventors, a real time filter development from the given data base may be implemented by selecting the two closest filters having location vectors surrounding the cluster vector y and interpolating the two groups of data filters selected. Such interpolation methods to create an even more accurate filter could be performed by any of a number of interpolation techniques as would be known in the art. In the main, building of the specific data bases and filter selection technique, whether independent or resultant, is a design expedient left to those creating particular implementations of the present invention.

Results

Despite the seeming complexity of the new enhanced high resolution image from low resolution image data, it has been found that the data processing time in the efficient resolution synthesis mode is negligible with respect to the average print time required for a full color print.

Figure 6:
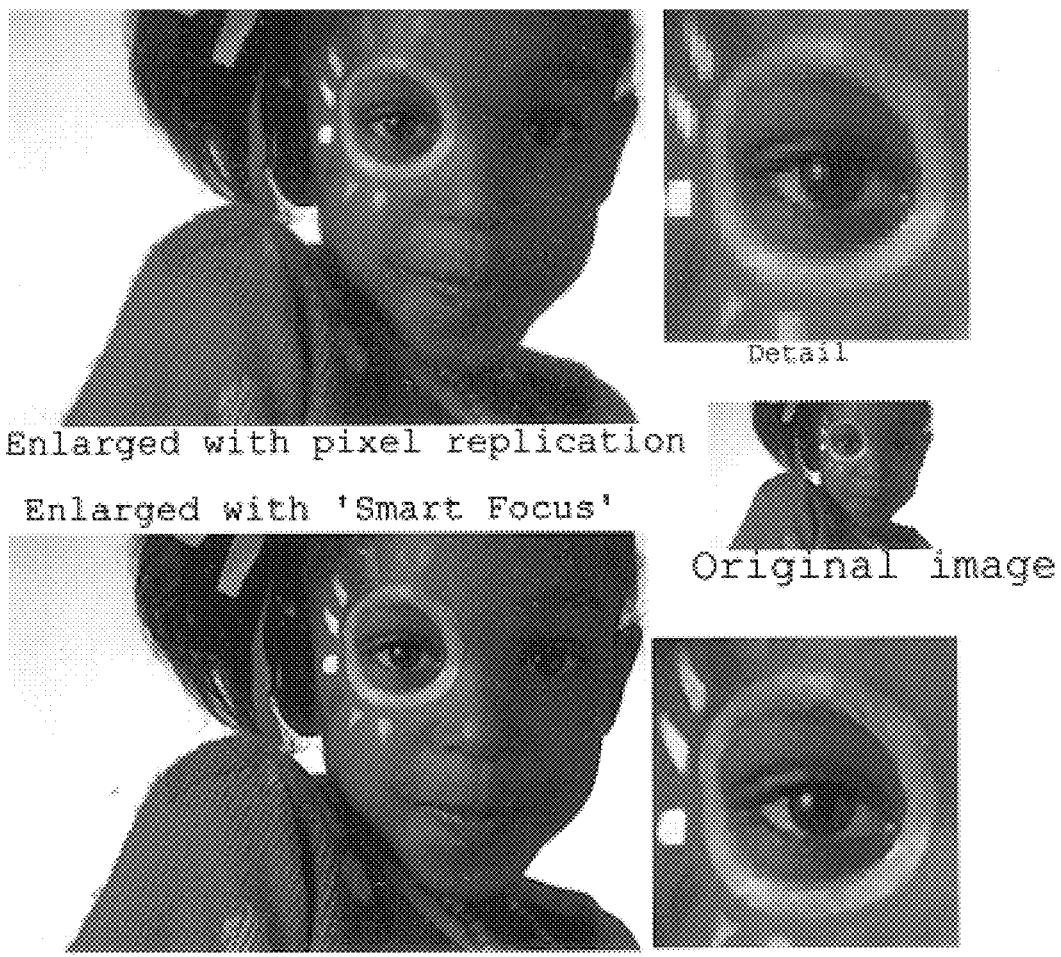
FIG. 6 is a color comparison of images printed without and with the application of the present invention as shown in FIGS. 1–5.

FIG. 6 shows two 300 dpi prints, comparing a non-enhanced version to a version enhanced in accordance with the present invention. In the non-enhanced version, 1.6× magnification has been used to show the stepped, or blocky, nature of the print; each block is a superpixel comprising 2×2 pixels.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for enhancing an input data set, representing a contiguous construct expressible as subsets of data coordinates representative of individual elements of the input data set, to increase resolution of the construct to an output construct resolution data set, the method comprising the steps of:

choosing a first data coordinate subset of the construct;

designating a set of second data coordinate subsets wherein each of the second data coordinate subsets is in a predetermined proximate relationship to said first data coordinate subset;

characterizing said set of second data coordinate subsets by a first vector representative of a value related to at least one construct characterizing factor of said contiguous construct providing a data base, said data base having groups of data filters for said at least one construct characterizing factor, each of said groups of data filters having a second vector identifying at least one construct characterizing factor data filter group directly related to said at least one construct characterizing factor such that filtering a data coordinate subset of said input data set by a second vector identified group of data filters enhances the resolution of said first data coordinate subset;

comparing said first vector to said second vector;

selecting at least one of said groups of data filters based on a predetermined relationship of said first vector to said second vector;

filtering said second data coordinate subsets with a selected group of data filters from said step of selecting to calculate a third subset of data coordinates consisting of a plurality of filtered second data coordinate subsets;

substituting said third subset for said first data coordinate subset in said construct; and repeating each step of said process for each first data coordinate subset in said construct.

2. The method as set forth in claim 1, said step of substituting further comprising the step of:

substituting $E^2$ elements of a data coordinate subset for chosen first data coordinate subset, where E is an order of magnitude of enhancement to be performed.

3. The method as set forth in claim 1, further comprising the steps of:

prior to said step of characterizing, analyzing each coordinate of said second data coordinate subsets with respect to a predetermined construct characterizing factor to determine if enhancement of said first data coordinate subset in accordance with subsequent steps of said method will enhance a region of said contiguous construct represented by said second data coordinate subset, and choosing a next first data coordinate subset when said predetermined construct characterizing factor analysis result is indicative of no need for enhancement.

4. The method as set forth in claim 1, said step of selecting at least one of said groups of data filters further comprising the steps of:

selecting a plurality of groups of data filters based upon a range of predetermined relationships of said first vector and said second vector.

5. The method as set forth in claim 4, said step of filtering further comprising the steps of:

applying each of said plurality of groups of data filters to said second data coordinate subsets.

6. The method as set forth in claim 4, further comprising the steps of:

deriving an optimum group of data filters based upon an interpolation of said plurality of groups of data filters.

7. The method as set forth in claim 6, said step of filtering further comprising the steps of:

applying said optimum group of data filters to said second data coordinate subset.

8. The method as set forth in claim 3, further comprising the steps of:

prior to said step of choosing a next first data coordinate subset, determining if resolution of the input data set matches the resolution of a predetermined output construct resolution;

upscaling resolution of said first data coordinate subset to said output construct resolution in a known manner; and outputting a fourth subset of data coordinates consisting of a plurality of first data coordinate subset upscaled by said known manner in substitution of said first data coordinate subset.

9. The method as set forth in claim 1, further comprising the steps of:

prior to said step of filtering, designating a set of fifth data coordinate subsets wherein each of said fifth data coordinate subsets is in a predetermined proximate relationship to said second data coordinate subset; and in said step of filtering, filtering said fifth data coordinate subsets and said second data coordinate subsets with a chosen set of data filters from said step of selecting.

10. The method as set forth in claim 9, said step of selecting at least one of said groups of data filters further comprising the step of:

selecting a plurality of groups of data filters based upon a range of predetermined relationships of said first vector and said second vector.

11. The method as set forth in claim 10, said step of filtering further comprising the step of:

applying each of said plurality of groups of data filters to said second and said fifth data coordinate subsets.

12. The method as set forth in claim 9, further comprising the step of:

deriving an optimum group of data filters based upon an interpolation of said plurality of groups of data filters.

13. The method as set forth in claim 12, said step of filtering further comprising the steps of:

applying said optimum of group of data filters to said second and fifth data coordinate subsets.

14. The method as set forth in claim 1, further comprising the steps of:

prior to said step of choosing, determining if said input data set comprises a data set previously enhanced in a known manner; and when said input data set is a data set previously enhanced in a known manner, reversing previous enhancements.

15. The method as set forth in claim 1, further comprising the steps of:

prior to said step of choosing, determining if said input data set comprises a decompressed data set; and when said input data set comprises a decompressed data set, downscaling said data set to original input data form.

16. A method for enhancing a graphics image by computerized enhancing of input data representative of a graphics image to increase resolution and providing resolution enhanced output data, said input data and said output data representing pixels of the graphics image, the method comprising the steps of:

selecting a pixel to be enhanced;

selecting a set of pixels circumscribing said pixel to be enhanced;

characterizing said set of pixels by a first key representative of a value related to at least one visual perception factor of graphics images;

providing a data base having a plurality of visual perception factor data filters for said at least one visual perception factor and each individual filter of said data base having a second key representative of a value related to said at least one visual perception factor;

comparing said first key to said second key;

selecting at least one data filter from said data base predicated on a predetermined relationship of said first key to said second key;

filtering said set of pixels circumscribing said pixel to be enhanced with a selected filter from said step of selecting to calculate an increased resolution for said pixel to be enhanced and substituting a plurality of pixels for said pixel to be enhanced based upon said step of filtering said set of pixels; and outputting said plurality of pixels.

17. The method as set forth in claim 16, said step of increasing the resolution further comprising the step of:

substituting $E^2$ filtered pixels for said pixel to be enhanced, where E is an integer representing the magnitude of the enhancing to be performed on a selected pixel to be enhanced.

18. The method as set forth in claim 16, further comprising the steps of:

prior to said step of selecting a pixel to be enhanced, creating an enhanced border of the graphics image via a process of pixel replication.

19. The method as set forth in claim 16, said step of outputting further comprising the steps of:

determining if resolution of the plurality of pixels matches a predetermined output resolution, and when said resolution of the plurality of pixels is less than said predetermined output resolution, upscaling resolution of said plurality of pixels to said predetermined output resolution in a known manner, and outputting an upscaled plurality of pixels.

20. The method as set forth in claim 16, further comprising the steps of:

prior to said step of selecting a pixel to be enhanced, determining if said input data is generated from a single, low resolution output data system.

21. The method as set forth in claim 20, further comprising the steps of:

when said input data is generated from a single, low resolution output data system, determining if said input data is non-bit mapped input data, and when said input data is non-bit mapped input data, upscaling resolution of said input data in a known manner, creating output data having a predetermined output resolution, outputting said output data, and loading a next set of input data representative of a graphics image to be enhanced.

22. The method as set forth in claim 20, further comprising the steps of:

when said input data is not generated from a single, low resolution output data system, determining if said input data is generated from a compatible operating system application; and when said input data is not generated from a compatible operating system application, upscaling resolution of said input data in a known manner, creating output data having a predetermined output resolution;

outputting said output data; and loading a next set of input data representative of a graphics image to be enhanced.

23. The method as set forth in claim 22, further comprising the step of:

when said input data is generated from a compatible operating system application, determining if a request for enhancing said image has been issued.

24. The method as set forth in claim 23, further comprising the steps of:

when a request for enhancing said image has been issued, proceeding with said method;

when a request for enhancing has not been issued, upscaling resolution of said input data in a known manner, creating output data having a predetermined output resolution;

outputting said output data; and loading a next set of input data representative of a graphics image to be enhanced.

25. The method as set forth in claim 16, further comprising the steps of:

prior to said step of selecting pixel to be enhanced, determining if said input data comprises data previously enhanced in a known manner; and when said input data is previously enhanced in a known manner, reversing previous enhancements.

26. The method as set forth in claim 16, further comprising the steps of:

prior to said step of selecting a pixel to be enhanced, determining if said input data comprises a decompressed data set; and when said input data comprises a decompressed data set, downscaling said decompressed data set to original input data form.

27. The method as set forth in claim 16, further comprising the step of:

prior to said step of characterizing a set of pixels circumscribing said pixel to be enhanced, sequentially analyzing each coordinate of input data of said pixel to be enhanced and said set of pixels with respect to a predetermined visual perception factor to determine if enhancement of said pixel to be enhanced in accordance with subsequent steps of said method will enhance a region of said graphics image represented by said pixel to be enhanced, and choosing a next pixel to be enhanced when said predetermined visual perception factor analysis result is indicative of no need for enhancement.

28. The method as set forth in claim 16, said step of selecting at least one data filter further comprising the steps of:

providing each data filter with groups of data filters related to said visual perception factor, and selecting a plurality of said groups of data filters based upon a range of predetermined relationships of said first key to said second keys.

29. The method as set forth in claim 28, said step of filtering further comprising the step of:

applying each of said plurality of groups of data filters to said pixels of said set of pixels circumscribing said pixel to be enhanced.

30. The method as set forth in claim 28, further comprising the steps of:

deriving an optimum single group of data filters based upon an interpolation of said plurality of said groups of data filters.

31. The method as set forth in claim 30, said step of filtering further comprising the step of:

applying said optimum single group of data filters to said pixels of said set of pixels circumscribing said pixel to be enhanced.

32. The method as set forth in claim 16, said step of selecting a set of pixels circumscribing said pixel to be enhanced further comprising the steps of:

selecting a first set of pixels contiguous to said pixel to be enhanced, selecting a second set of pixels contiguous to said first set.

33. The method as set forth in claim 32, said step of filtering said set of pixels circumscribing said pixel to be enhanced with a selected filter further comprising the step of:

filtering both said first set of pixels and said second set of pixels.

34. A system for generating graphics images, including rendered alphanumeric text images, said system including a memory device for storing and operating an image resolution enhancement method, said method comprising the steps of:

a) receiving a source data set of pixel data for each pixel of a graphics image, said source data having a form of spatial coordinates;

b) determining if said data set is an upscaled data set, and when said data set is an upscaled data set, downscaling said data set;

c) selecting a window of pixels, including a target pixel and at least some pixels contiguous to said target pixels;

d) comparing the variation of a spatial coordinate of said contiguous pixels to a same spatial coordinate of said target pixel with respect to a variation threshold value, and if no variation exceeds said variation threshold value, replacing the target pixel with a plurality of higher resolution pixels generated in a known manner and returning to step c), and if a variation exceed said variation threshold vale, continuing with step e);

e) calculating an image characteristic factor for each of the pixels of said window;

f) comparing the variation of the image characteristic factor for said contiguous pixels to a same image characteristic factor for said target pixel to a range of image characteristic factors, and if said variation is within said range, replacing the target pixel with a plurality of higher resolution pixels generated in a known manner and returning to step c), and if said variation is above said range, continuing with step g);

g) providing a data base of groups of data filters, each of said groups of data filters being classified by a mean vector related to said image characteristic factor;

h) calculating a cluster vector for said window related to said image characteristic factor;

i) sequentially comparing said cluster vector to each said mean vector;

j) selecting at least one group of data filters based on a predetermined relationship of said cluster vector to at least one mean vector;

k) applying said at least one group of data filters selected in step j) and calculating a plurality of pixels to replace said target pixel therefrom;

l) replacing said target pixel with said plurality of pixels;

m) sending said plurality of pixels to an output device for generating a resolution enhanced visual image, and n) returning to step c), and continuing said process until all pixels of said image have been selected.

35. The system as set forth in claim 34, step i) further comprising the steps of:

selecting a plurality of sets of said groups of data filters, weighting said plurality of sets to obtain an interpolated group of data filters, and proceeding with step j) using said interpolated group of data filters.

36. The system as set forth in claim 35, said step of weighting further comprising the steps of:

weighting falling off with distance following a Gaussian distribution in accordance with the calculation:

$$\text{weighting} = \frac{\Pi_i * e^{(-0.5 \; * \; \text{distance sq./variance})}}{\Sigma_{\text{Selected classes}}(\Pi_i * e^{(-0.5 * \text{distance sq./variance})})}$$

where

"$\Pi_i$" is a predetermined magnitude for a class.

37. The system as set forth in claim 34, step j) further comprising the steps of:

selecting only a first group of data filters meeting predetermined relationship of said cluster vector to said mean vector, and proceeding with step k) using said first group of data filters.

38. The system as set forth in claim 34, said step l) further comprising the step of:

substituting $E^2$ pixels for a chosen target pixel, where E is an order of magnitude of enhancement to be performed on said image.

39. The system a set forth in claim 34, step c) further comprising the steps of:

selecting a target pixel, selecting every pixel circumscribing said target pixel, creating a first window for characterizing a region of said image, and selecting a plurality of pixels circumscribing said first window, creating a second window for filtering said input data to perform step k).

* * * * *